United States Patent [19]

Price

[11] 4,293,425

[45] Oct. 6, 1981

[54] METHOD OF CHLORINATING SWIMMING POOLS AND THE LIKE

[75] Inventor: Kenneth E. Price, 1534 Channelwood Dr., Whittier, Calif. 90601

[73] Assignee: Kenneth E. Price, Whittier, Calif.

[21] Appl. No.: 112,097

[22] Filed: Jan. 14, 1980

Related U.S. Application Data

[60] Division of Ser. No. 906,673, May 15, 1978, Pat. No. 4,210,624, which is a continuation of Ser. No. 735,964, Oct. 27, 1976, abandoned.

[51] Int. Cl.$^3$ .............................................. E04H 3/20
[52] U.S. Cl. .................................................. 210/754
[58] Field of Search ......................... 210/62, 169, 754; 422/264, 277, 265, 274, 282, 278, 263, 266; 251/6

[56] References Cited

U.S. PATENT DOCUMENTS

| | | | |
|---|---|---|---|
| 1,033,717 | 7/1912 | McClellan | 251/6 |
| 1,409,248 | 3/1922 | Levcik | 422/264 |
| 2,142,947 | 1/1939 | Kretzschmar | 422/264 |
| 2,908,476 | 10/1959 | Hidding | 251/6 |
| 3,410,517 | 11/1968 | Wall | 251/8 |
| 3,456,801 | 7/1969 | Bowles | 210/169 |
| 3,828,983 | 8/1974 | Russo | 422/264 |
| 3,899,425 | 8/1975 | Lewis | 210/169 |

Primary Examiner—Hiram Bernstein
Attorney, Agent, or Firm—Christie, Parker & Hale

[57] ABSTRACT

In chlorinating a swimming pool equipped with a periodically operating pump arranged to circulate water from the pool through a filter assembly and back to the pool, chlorination of the pool water is accomplished by the use of a solid chlorinating material. The chlorinating material is introduced into an openable airtight chamber which has a water inlet to and a water outlet from the chamber at the bottom thereof. To prepare the chamber for insertion of chlorinating material, a valve in a duct to the water inlet is closed and a check valve associated with the outlet prevents backflow of water into the chamber so that before opening the chamber air previously contained in the chamber from a prior loading of chlorinating material expands in the chamber to express water from the chamber through the outlet, thereby providing an essentially dry chamber. The chamber is then opened and additional chlorinating material is placed therein. The chamber is then first closed and the valve to the inlet is opened. Operation of the pump motor introduces water under pressure into the chamber to compress air therein and to cause water to flow over the chlorinating material.

1 Claim, 4 Drawing Figures

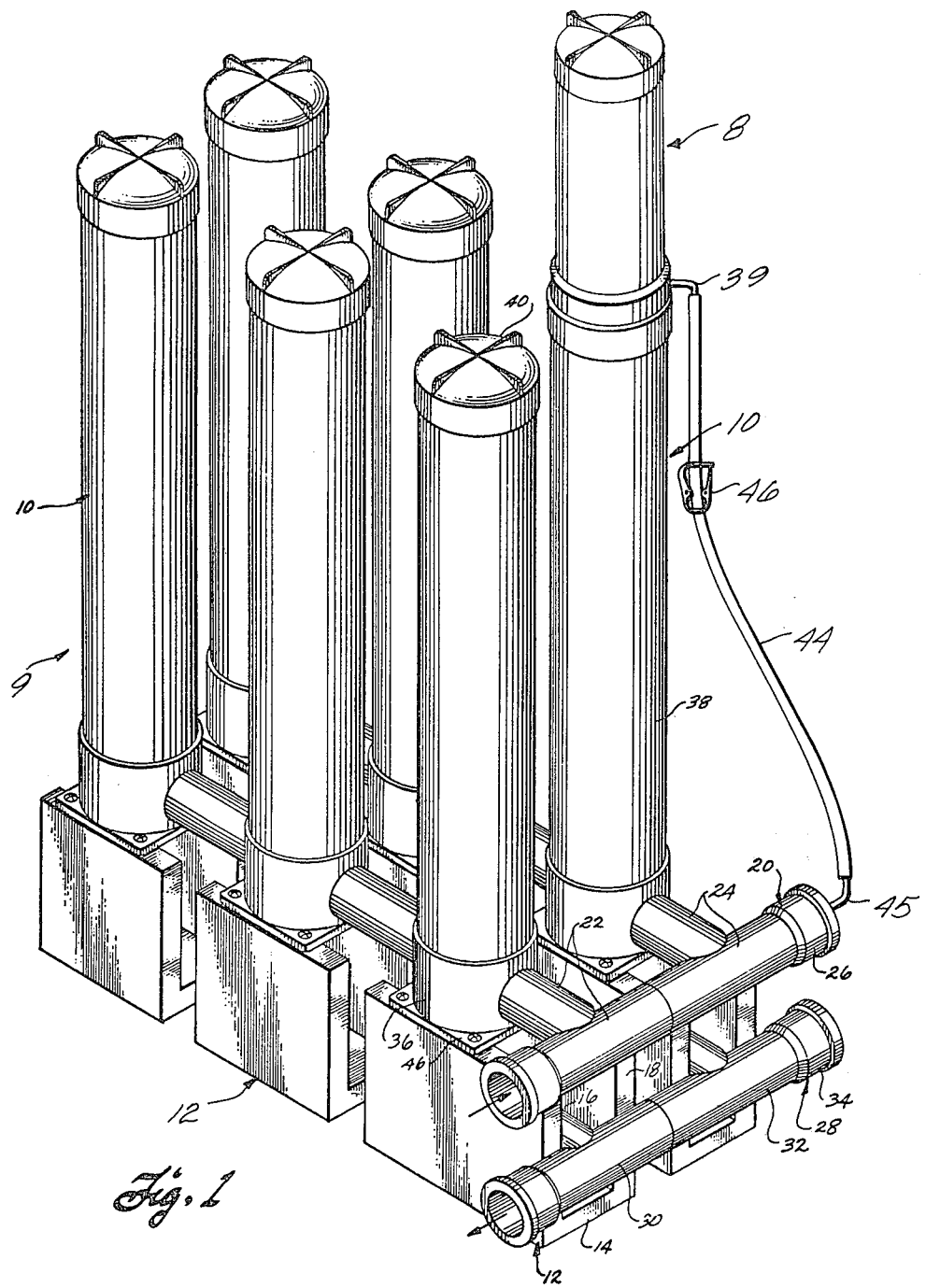

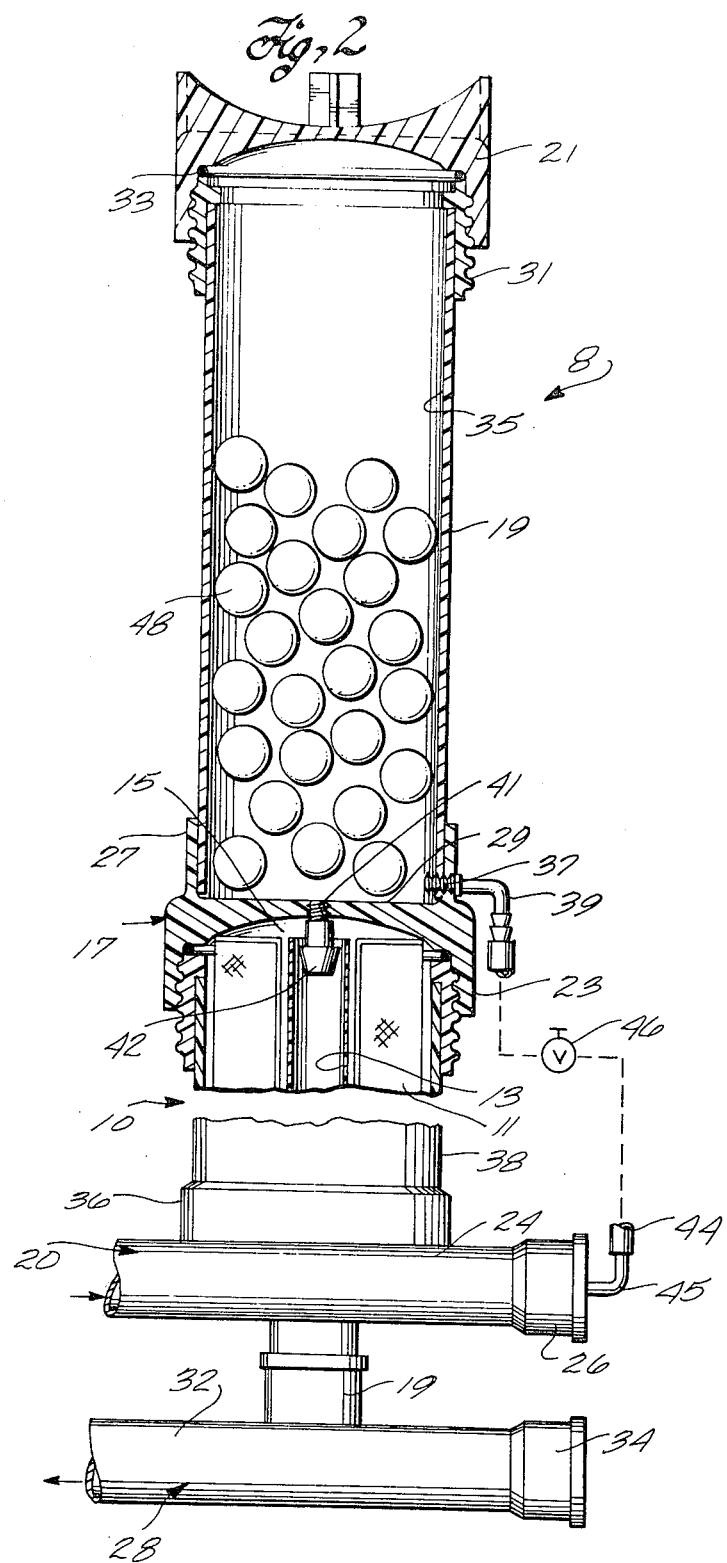

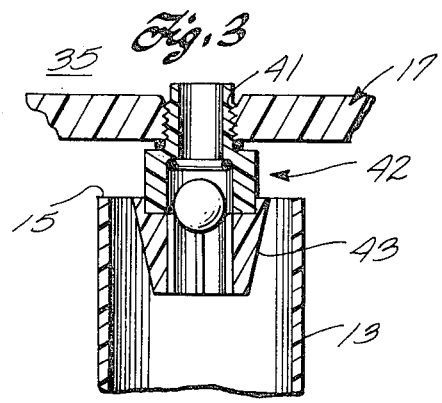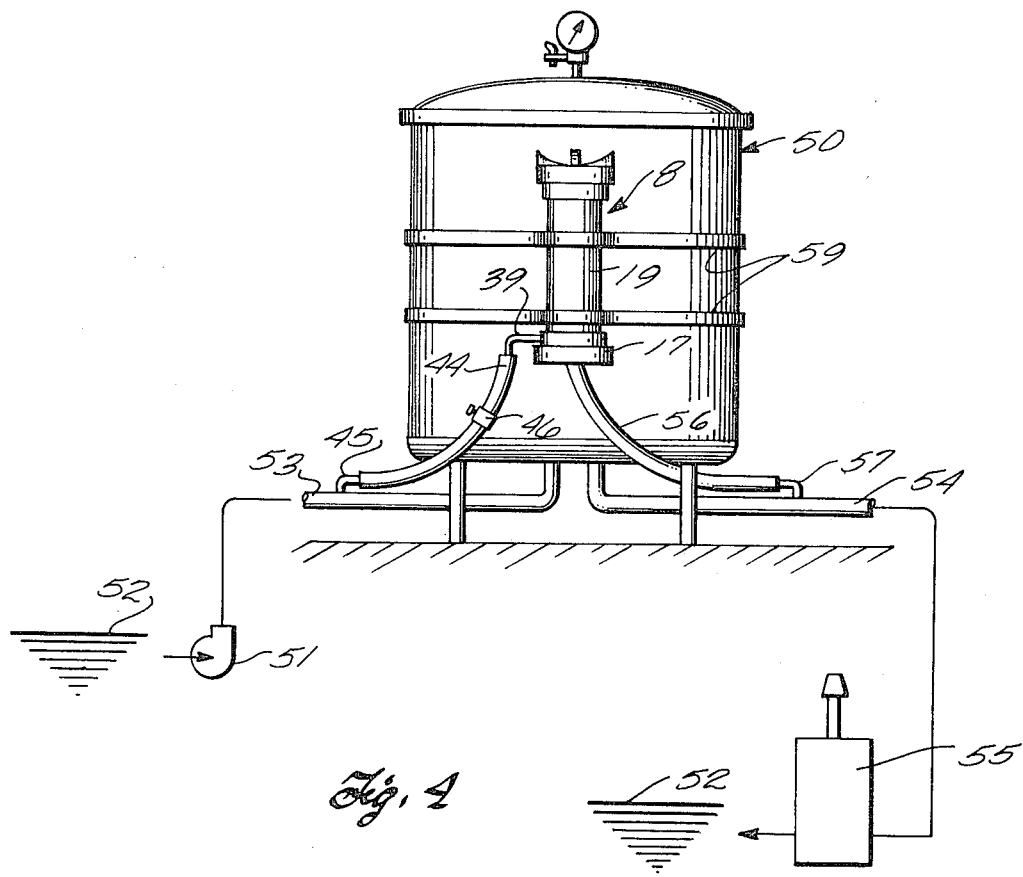

METHOD OF CHLORINATING SWIMMING POOLS AND THE LIKE

CROSS-REFERENCE TO RELATED APPLICATIONS

This is a division of application Ser. No. 906,673 filed May 15, 1978, now U.S. Pat. No. 4,210,624 which was a continuation of application Ser. No. 735,964 filed Oct. 27, 1976, now abandoned.

BACKGROUND OF THE INVENTION

1. Field of the Invention

This invention pertains to a method for chlorinating a swimming pool with dry chlorine material.

2. Review of the Prior Art

U.S. Pat. No. 3,899,425 shows, in FIG. 3 thereof, a chlorinator which is useful with the modular filter assembly shown in FIGS. 1 and 2 of the patent. This chlorinator has several desirable features, including its usefulness with dry or pelletized chlorine material, its structural and operational simplicity, and its relatively low cost, in addition to its compatibility with the modular filter assembly. The filter assembly and the chlorinator described in U.S. Pat. No. 3,899,425 are commercially available and, since first being introduced, have enjoyed considerable commercial success.

Experience with the chlorinator described in U.S. Pat. No. 3,899,425 has shown that it suffers from certain problems. No problem is encountered when water flows continuously through the chlorinator. However, in most instances, the problem occurs when the flow of water through the chlorinator is interrupted for a period of several hours every day. In a home swimming pool installation in which a circulation system is provided, the timer-controlled circulation pump operates only part of the day. When no water flows through the filter assembly with which the prior chlorinator is used, water is often trapped in the lower portion of the chlorinator chamber. This residual water within the chlorinator is in direct contact with the soluble granular or pelletized chlorine material which dissolves to form a highly chlorinated water charge in the chlorinator. When the circulation pump is next turned on, a charge of over-chlorinated water is injected into the swimming pool. The result is that, despite its many advantages and great commercial success, the chlorinator described in U.S. Pat. No. 3,899,425 often presents the problem of over-chlorination of the pool and waste of dry chlorine material.

In the chlorinator shown in U.S. Pat. No. 3,899,425, the position of the valve which controls the rate of flow of water through the chlorinator chamber is set with respect to normal operating conditions which correspond to periods when the pool circulation pump is operating. Any chlorination effect occurring during periods when the circulating pump is not operating is a chlorinating effect in excess of that desired and is, as a practical matter, very difficult to control or to compensate.

SUMMARY OF THE INVENTION

This invention provides a chlorinator which may be used with a modular filter assembly of the type shown in FIGS. 1 and 2 of U.S. Pat. No. 3,899,425, as well as with more conventional tank-type filter assemblies, in the circulation and purification system for a swimming pool. The present chlorinator is used with granular or pelletized dry chlorine material. The present chlorinator provides contact between the dry chlorine material and the pool water only during periods in which the pool circulation pump is operative. The flow of water through the chlorinator is more precisely regulated to provide improved control over the concentration of chlorine in the pool water. The present chlorinator is simple, effective, efficient and economic.

Generally speaking, this invention provides a method for chlorinating water in a swimming pool which comprises the step of providing an openable airtight chamber which has a water inlet and a water outlet at the bottom thereof. The outlet is equipped with a check valve preventing flow of water through the chamber to the outlet, and the inlet is equipped with a closable valve. The method also includes a pump so that the inlet and outlet are connected to separate points of the system with the inlet being connected to a point in the system having water pressure during operation of the pump which is higher than the point to which the outlet is connected. The method includes initially loading a quantity of dry, water-soluble chlorinating material into the chamber at a time when the pump is not operating, the valve is closed and the chamber is dry, and thereafter sealing the chamber in an airtight manner to entrap air in the chamber with such material. The valve is operated in conjunction with operation of the pump to establish a desired flowrate into and through the chamber and to cause air entrapped in the chamber to be compressed into the upper portion of the chamber. The entrapped air in the chamber expands to force water from the chamber during periods when the pump is not operating. The method further includes the step of periodically, as needed, recharging chlorinating material into the chamber by interrupting the operation of the pump and closing the regulating valve to allow air in the chamber to force water from the chamber through the outlet, opening the chamber and introducing a desired quantity of the chlorinating material, closing the chamber in an airtight manner to entrap air in the chamber, opening the valve to re-establish the desired flowrate to the chamber, and re-establishing operation of the pump.

DESCRIPTION OF THE DRAWINGS

The above-mentioned and other features of this invention are more fully set forth in the following description of a presently preferred embodiment of the invention, which description is presented with reference to the accompanying drawings, wherein:

FIG. 1 is a perspective view of the chlorinator installed in conjunction with a filter assembly according to U.S. Pat. No. 3,899,425;

FIG. 2 is a side elevation view, partially in cross-section, illustrating the connection of the chlorinator module to a filter module;

FIG. 3 is an enlarged cross-sectional elevation view of the check valve associated with the chlorinator outlet port; and FIG. 4 is an elevation view showing the use of the chlorinator with a tank-type filter in a swimming pool circulation system.

DESCRIPTION OF THE ILLUSTRATED EMBODIMENT

FIG. 1 shows a chlorinator 8 as used with a modular filter assembly 9 of the type described in U.S. Pat. No.

3,899,425. The assembly is composed of individual filter modules 10. The details of filter assembly 9 are set forth in U.S. Pat. No. 3,899,425 to which reference is made. Briefly, however, the several modules 10 are each located on a support member 12 which is of channel-like form having a base 14 and a pair of upwardly extending walls 16 and 18. The filter system has an intake manifold 20 having T connections 22 and 24 to the individual rows of filter modules. One end of inlet manifold 20 is closed with a cap 26, the other end of the manifold being open to serve as the inlet opening for water flow to the filter assembly. The output from the assembly 9 is via an outlet manifold 28 which has T connections 30 and 32 to the rows of filter modules and a cap 34 at one end. The other end of the outlet manifold is open to serve as the outlet opening from the filter assembly.

Each filter module includes a base 36, an upright cylindrical body 38 connected to the base, and a removable cap 40. Preferably, the inlet and outlet manifolds and the individual filter module bodies are all fabricated from polyvinyl chloride moldings or tubing. The body of each filter module conveniently is made from 3 inch diameter polyvinyl chloride pipe.

As shown in FIG. 2, each filter module 10 includes an annular elongate filter cartridge 11 which is disposed within the module body circumferentially around a tube 13. The tube has its upper end 15 located adjacent the upper end of the filter element just below the module cap or, in the case of the filter module to which chlorinator 8 is mounted, just below the base 17 of the chlorinator. The lower end of tube 13 has its outer circumference sealed to the bottom of the chamber in which the filter element 11 is located. The inner end of the tube communicates through the module base 36 to a duct 19 by which the tube is connected to the outlet manifold 28 of the filter assembly 9. The chamber inside which the filter element 11 is located is connected to the inlet manifold 20. As shown in FIG. 2, the upper end of the filter element 11 snugly abuts against the lower end of chlorinator base 17 or of cap 40, as the case may be; the lower end of each filter element is sealed to the bottom of the element chamber. During operation of the filter assembly, water is supplied by a pump (not shown, but compare FIG. 4) to the inlet manifold 20 and into each of the filter modules.

The water flow path in each module 10 is upwardly around the outer circumference of the filter element 11, and radially through the filter element into the annulus within the element around the circumference of the tube 13. Water then flows upwardly along the exterior of tube 13 toward the upper end of the filter module where it enters the interior of the tube to pass to the outlet manifold 28. The only way water can flow from the inlet to each filter chamber to the interior of a tube 13 is by this flow path. Accordingly, a substantial pressure drop exists between the inlet to each filter module and the interior of tube 13 within the module. This pressure drop is relied upon to assure proper operation of chlorinator 8 when a cap 40 from one of the filter modules 10 is removed and the chlorinator is connected to that filter module in place of the cap, as shown in FIG. 2.

Chlorinator 8 includes a base 17, a cylindrical body 19, and a removable covering cap 21. Preferably the base, the body and the cap are fabricated of polyvinyl chloride; the body conveniently can be a length of 3 inch diameter PVC pipe. The base has an internally threaded circumferential skirt 23 by which the base is connected to one of filter modules 10 in place of module cap 40. The base also has an annular skirt 27 which extends coaxially of skirt 23 from the opposite side of a web portion 29 which forms the partition between the chlorination chamber 35 and the filtration chamber of the filter module. One end of body 19 is disposed within and solvent welded to skirt 27 to affix the base to the body. A molded, externally threaded sleeve 31 is affixed to the opposite end of body 19 to receive internally threaded cap 21. An O-ring 33 cooperates as a gasket between the sleeve and cap 21 to provide an airtight seal between the sleeve and the cap when the cap is threaded onto the sleeve. Thus, the interior of the chlorinator defines an airtight chamber 35 which is selectively openable on removal of cap 21.

An inlet port 37 communicates to the interior of chlorinator chamber 35, essentially at the bottom thereof, through a side wall of the chamber. Preferably the inlet port is defined by a tapped hole through the skirt 27 and body 19 and into which a molded plastic elbow 39, having an integral tubing connection, is screwed. An outlet port 41 communicates to chamber 35 through the bottom of the chlorinator, i.e., through the web 29 of base 19 coaxially of the base. The coaxial positioning of outlet port 41 allows a check valve 42, coupled to the chlorinator at the outlet port, to project into the upper end of tube 13 in the filter module to which the chlorinator is connected; see FIG. 2.

Check valve 42 is shown in detail in FIG. 3. The preferred valve is of the ball type arranged to prevent flow of water into chamber 35 through the outlet port. The outlet port 41 from chamber 35 is tapped, and the coupling of the check valve to the outlet port is via external threads on the upper end of the check valve assembly. Preferably, the length of the check valve assembly along the axis of the chlorinator is less than the extent of skirt 23 along the same axis so that the check valve is located entirely within the recess bounded by skirt 23. The lower exterior portion of the check valve can be tapered, as at 43, to facilitate the connection of a length of tubing to the chlorinator outlet port via the check valve.

To complete the installation of chlorinator 8 to filter assembly 9, a duct is connected to elbow 39 and also to a similar elbow 45 which provides communication to intake manifold 20 through end cap 26. If chlorinator 8 is being added to an existing filter assembly 9, then the connection of elbow 45 to cap 26 will require that a hole be drilled and tapped in the intake manifold end cap. A valve 46 is provided in duct 44.

It has been found that certain synthetic resins are very satisfactory materials for equipment and accessories for swimming pools, particularly in association with pool chlorination systems. It is therefore preferred, as noted above, that chlorinator 8 including check valve 42, elbows 39 and 45 and duct 44 be fabricated of synthetic materials. A preferred duct is a heavy wall flexible vinyl tubing, and a preferred control valve mechanism 46 (as shown in FIG. 1) is of the pinch type through which the tubing extends. The valve 46 should be operable through a range from complete closure of the duct to an essentially full-open condition.

To install chlorinator 8 on the filter assembly 9, one merely removes one of caps 40 from one of the filter modules 10 and screws the chlorinator module to that filter module. As the chlorinator is screwed into place, the chlorinator check valve 42 is automatically inserted into the upper end of the exit tube 13 of the filter module. Elbow 45 is connected to the intake manifold, and duct 44 and valve 46 are connected as described. This is done at a time when no water is flowing through the filter assembly. At first, valve 46 is placed in its closed position. The chlorinator cap is removed, a charge of suitable "dry" chlorine material 48 is loaded into chamber 35, and the cap 21 is securely re-engaged with the chlorinator body to reestablish the airtight integrity of chamber 35. Then, the pump for the filter assembly is turned on and valve 46 is opened to either a full ON or partial ON position.

The water pressure in intake manifold 20 is greater than the water pressure in outlet tube 13 in any of the filter modules. Thus, water flows through inlet port 37 into the chlorinator chamber 35 and via check valve 42 through outlet port 41. The water pressure at the inlet port 37, even as partially throttled by valve 46, is greater than atmospheric pressure. Accordingly, during periods when water flows through the chlorinator chamber, the level of water in the chlorinator is at some intermediate location between the top and bottom of the chlorinator chamber. The precise location of the air-water interface is dependent upon the pressure differential which exists between the chlorinator inlet and outlet ports. This differential obviously is affected by secondary factors such as the head loss associated with the ducting and valving between the inlet manifold and the inlet port, and the pressure losses associated with the check valve 42. Control valve 46 is adjusted on a trial and error basis until the proportion of water flowing through the chlorinator, relative to the volume of water passing through the filter assembly overall, is so adjusted that an appropriate level of chlorination is maintained in the swimming pool.

When the pool circulation pump is not operative, the pressure of water presented to inlet port 37 drops so that the compressed air bubble in the upper extent of the chlorinator chamber can expand to its initial volume which is that of chamber 35. Accordingly, when the circulation pump is shut down, there is no water in the chlorination chamber and no chlorinating action takes place.

As shown in FIG. 4, chlorinator 8 can be used to advantage with a tank-type filter 50. The chlorinator usually is coupled in parallel with the filter. Thus, in a typical pool system, a circulation pump 51 has its inlet connected to receive water from a swimming pool 52 and has its outlet connected by a supply pipe 53 to filter 50. The filter has an outlet pipe 54 which is connected to the inlet of a pool heater if a pool heater is provided; otherwise, the filter outlet pipe 54 is connected directly back to swimming pool 52. To install chlorinator 8 in the swimming pool system illustrated in FIG. 4, the inlet port of the chlorinator is connected by tubing 44 and control valve 46 to the filter supply pipe 53. The outlet port of the chlorinator is connected by a length of tubing 56 to the filter outlet pipe 54. Preferably, tubing 56 has one end connected to the check valve associated with the chlorinator outlet port, the other end of tubing 56 being connected to the filter outlet pipe via an elbow 57. The connection of tubing 44 and 56 to the filter supply and outlet pipes, respectively, via elbows 45 and 57 may require that holes be drilled and tapped into the respective pipes. The chlorinator may be positioned in any desired location relative to filter 50. A convenient placement of the chlorinator is on the side of the filter where it is held by suitable straps or cords 59 around both the chlorinator body and the filter tank. The chlorinator mounting must permit chlorinator cap 21 to be removed periodically so that the charge of dry chlorine material within the chlorinator can be replenished as needed.

Workers skilled in the art to which this invention pertains will readily appreciate that modifications, alterations, or variations in the structures described above may be practiced consistent with the teachings of the foregoing description and without departing from the scope of this invention. The invention has been described above with reference to the presently most-preferred embodiment of the chlorinator, as required by statute. It is therefore apparent that the preceding description is not exhaustive of all forms which chlorinators according to this invention may take. Accordingly, the foregoing description should not be considered as limiting the scope of this invention.

What is claimed is:

1. A method of chlorinating water in a swimming pool and the like comprising the steps of
   (a) providing an openable airtight chamber having a water inlet to and a water outlet from the chamber at the bottom therein, the outlet being equipped with a check valve operable to prevent flow of water into the chamber through the outlet, the inlet being equipped with a closable water flow regulating valve,
   (b) connecting the chamber into a water circulation system for a swimming pool and the like, which system includes a pump, so that the inlet and the outlet are connected to separate points in the system and the inlet is connected to a point at which water in the system, during operation of the pump, is at a higher pressure than the point to which the outlet is connected,
   (c) initially loading a quantity of dry water-soluble chlorinating material into the chamber at a time when the pump is not operating, the regulating valve is closed, and the chamber is dry, and then sealing the chamber in an airtight manner to entrap air in the chamber with said material,
   (d) operating the pump and opening the regulating valve to establish a desired water flowrate into and through the chamber and to cause the air entrapped in the chamber to be compressed in the upper portion of the chamber by an amount related to the pressure of water applied to the chamber through the inlet,
   (e) the air in the chamber expanding therein to force water from the chamber during periods when the pump is not operating, and
   (f) periodically, as needed, recharging chlorinating material into the chamber by a procedure which includes the steps of
      (1) interrupting operation of the pump, and closing the regulating valve to enable air entrapped in the chamber to force water from the chamber through the outlet,
      (2) opening the chamber and introducing a desired quantity of chlorinating material into the chamber,
      (3) closing the chamber in an airtight manner to entrap air therein as aforesaid,
      (4) opening the regulating valve to re-establish the desired water flowrate into and through the chamber, and
      (5) re-establishing operation of the pump.

* * * * *